Oct. 11, 1949.  E. J. SCHREIBER  2,484,470
SELECTIVE ANIMAL TRAP
Filed July 2, 1948

INVENTOR.
EDWARD J. SCHREIBER,
BY
McMorrow, Berman + Davidson
ATTORNEYS.

Patented Oct. 11, 1949

2,484,470

UNITED STATES PATENT OFFICE 2,484,470

SELECTIVE ANIMAL TRAP

Edward J. Schreiber, Willimantic, Conn.

Application July 2, 1948, Serial No. 36,661

3 Claims. (Cl. 43—90)

This invention relates to animal traps and particularly to a type of trap which is capable of selective operation.

The main object of my invention is to provide a special animal trap which when set for trapping, will trap and hold foxes, ground-hogs, minks and other animals with small legs, but will automatically lock in releasing position when sprung by dogs, such as bird-dogs, hounds and such valuable dogs as are used in hunting and the like.

Another object is to provide such a trap which will operate largely according to conventional principles especially when sprung by a thin-legged wild animal but is equipped with means which modify or prevent conventional operation when a domestic animal with thicker legs causes the trap to spring.

A further object is to have such a trap provided with a pivoted jaw having a locking notch at one side or end thereof for engaging with the trap spring when the latter has become released in order to stop the spring mid-way of its travel and prevent further movement thereof.

It is also an object to provide the trap with a second jaw which is pivoted so high at one end or side adjacent to the notched end of the first-mentioned jaw that it will tend to crowd the trap spring and direct it into the locking notch of the first when the second jaw is impeded or blocked by the leg of a dog or pet animal.

A practical object is, of course, to produce a trap of the indicated character which is simple to make and use, which is durable and not likely to get out of order, and of such reasonable cost as to encourage wide distribution among farmers, hunters and trappers generally.

Further objects and advantages of my invention will appear in further detail as the specification proceeds.

In order to facilitate ready comprehension of this invention for proper appreciation of the salient features thereof, the invention is illustrated on the accompanying drawing forming part hereof, and in which.

Throughout the views, the same reference numerals indicate the same or like parts.

Figure 1:
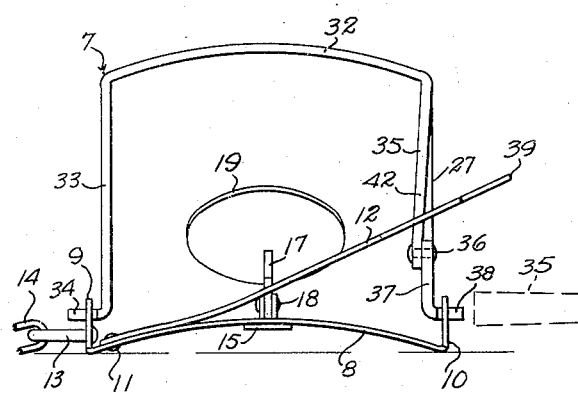
Figure 1 is an elevation of an animal trap made according to the invention and embodying the same in a practical form, the view being taken looking through the two jaws when they are held in upright locked position by the trap spring.

Rather frequently it has been the experience of hunters and trappers and especially farmers that when animal traps of the pivoted jaw type are set out for wild animals, their own pets, watch dogs, or valuable hunting dogs have been caught and badly cut by the trap jaws, not to mention that these animals have sometimes also been subjected to exposure because they were unable to escape and reach the accustomed home or shelter. This situation has been so serious, that it has gained unfavorable attention of various law-making bodies with the result that in several States of this country stringent laws have been passed against the use of all traps of this class.

Now it has occurred to me that if an animal trap of the kind under consideration can be furnished with some novel means which will impart the capacity for discriminating between valuable domestic and farm animals and wild animals intended to be trapped, such a trap will immediately be safe and virtually ideal to use, and in fact will become a necessity in most rural districts everywhere. After carefully analyzing this problem, I have found it quite feasible to recast the conventional animal trap in a novel form to serve the mentioned purpose as will now be described in detail.

Hence, in the practice of my invention and referring again to the drawing, the trap generally indicated at 7 primarily includes the more or less conventional base plate 8 having the upwardly extending lugs 9 and 10 at the ends thereof, while adjacent to the lug 9 the base plate has a riveted connection at 11 with the trap spring 12, of which more later. To the lug 9 is also attached an anchor link 13 by which a chain 14 may anchor the trap to a tree or a post in a manner superfluous to describe, as it is entirely conventional.

To the intermediate portion of the bottom of base plate 8 is fixed a transverse cross plate 15 by means of rivets or the like, this cross plate being provided with a pair of upwardly projecting lugs 16, 16 to which a plate lever 17 is pivoted by means of pivot pin or rivet 18. Upon one end of this lever 17 is fixed a tripping plate 19, which extends over the intermediate portion of base plate 8, while upon the pivoted end of the lever the latter is provided with a trip detent 20 adapted to cooperate with a trip member 21 terminating at one end in attachment ring 22 engaging the eye 23 in the outer or longer end of the cross plate 15.

Figure 2:
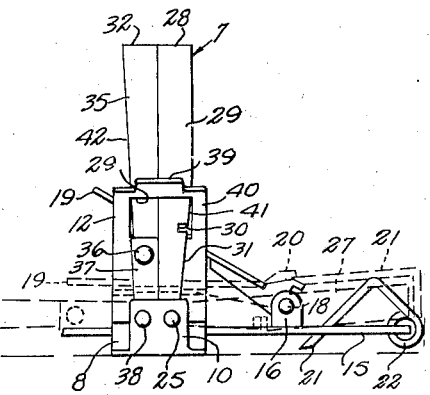
Figure 2 is an end view of the same trap also indicating the open position of the jaws in broken lines.
Figure 3:
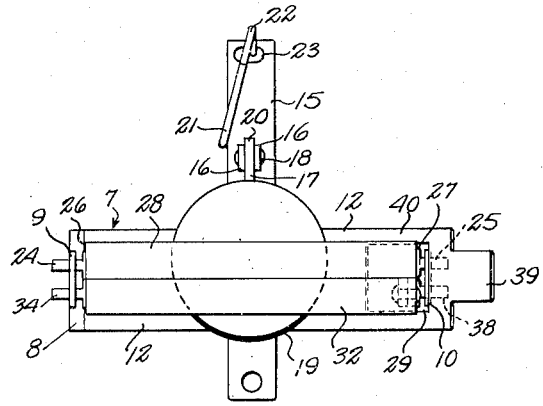
Figure 3 is a plan view of the trap as seen from the top in Figure 1.

In the previously mentioned upwardly extending lugs 9 and 10 are pivoted the trunnions 24, 25 extending rigidly in opposite directions from the side arms or ends 26, 27 of a jaw 28, which in general form and in its location in relation to the lugs is mainly conventional except for one feature which is about to be explained. The lower end of the jaw arm 27 extends through the eye 29 in the outer working end of the spring 12, the lower end being inclined or tapered toward the trunnion 25 and at a predetermined distance above the trunnion is provided with a notch 30 capable of receiving the side of the spring eye 29 therein if the jaw is prevented from being instantly raised by the spring in conventional operation. The mentioned jaw is that which is intended to be held ready to be tripped by contact of the foot of an animal with trip plate 19 by having the jaw 28 lowered into the position indicated at the right in broken lines in Figure 2, with the trip member 21 engaging in detent 20 of lever 17 in the lowered position of plate 19, as also indicated in broken lines in Figure 2, and in all respects, except for the lower tapered side or end 31 of the arm 27 carrying the notch 30, are this jaw and the other appurtenances of the trap conventional.

Figure 4:
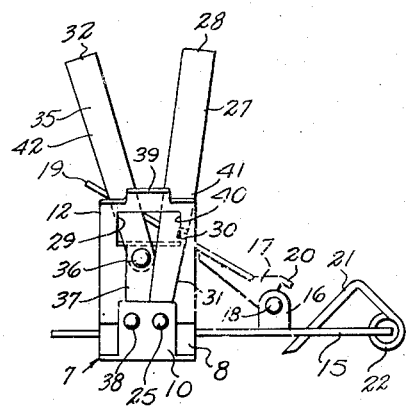
Figure 4 is an end elevation similar to that of Figure 2, showing the intermediate novel and unconventionally operated position of the jaws, particularly illustrating the features of the invention.
Figure 5:
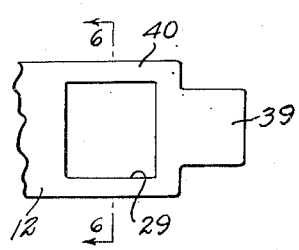
Figure 5 is a fragmentary plan view of the operating end of the trap spring showing the eye portion thereof, which operates the jaws.
Figure 6:
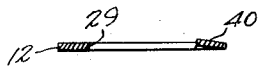
Figure 6 is a transverse section taken on line 6—6 in Figure 5.

However, the other jaw 32 has one conventional arm 33 provided with a trunnion 34 extending through an aperture in lug 9, but the other arm 35 is shorter than the arm 33 just described and is connected by a pivot pin or rivet 36 at its lower end to the upper end of a stub arm 37 formed with a trunnion 38 protruding through an aperture in the upwardly extending lug 10. The length of the arms 35 and 37 together are intended to equal arm 27 of the opposite jaw or the other arm 33 of the same jaw 32, but due to the presence of the pivoted connection between the short arm 37 and the relatively longer arm 35 to make up the full length of the side this arm structure may be considered as provided with a knuckle just below the level of the notch 30 in the other jaw. The arrangement is such that when the trap is open and ready for operation, the spring 12 is of course held down particularly by jaw 28, the arm 27 thereof directly engaging against the spring when locking clip or member 21 holds the jaw in its lowered position upon cross plate 15 adjacent to aperture 23, the member 21 being hooked under the detent 20 and ready to be released therefrom upon an animal placing its foot upon contact plate 19. When this occurs, the latch member 21 is released from detent 20 and allows jaw 28 to swing upwardly under the bias of the spring 12 by the side 40 of the spring at the right of the eye 29 wiping against the inclined or tapered side 31 of arm 27 on jaw 28, and simultaneously the short arm 37 will be forced upwardly by the spring and provided that the animal at the trap has a thin leg, the spring will quickly proceed upwardly to erect the upper arm 35 of jaw 32 while the inclined side portion 40 will quickly pass notch 30 and engage against the upper section 41 of arm 27, as shown in full lines in Figure 2, so that both jaws 28 and 32 will close upon the leg of the animal. Should the animal at the trap be a domestic pet or a valuable dog, such animals as a rule have thicker legs than the wild animals largely because they are well-fed and cared for, and in such case the relatively thicker leg would impede the upward erection of jaw 32 above pivot 36, so that the outer side or edge 42 of upper short arm 35 of jaw 32 would temporarily form a stop or at least an impediment to the upward movement of the spring 12 and thereby would crowd the spring in such fashion as to cause it to enter the notch 30 in jaw arm 27, thereby stopping the spring mid-way and preventing it from proceeding further up to close the jaws. The result is that the jaws will occupy the semi-closed position shown in Figure 4, wherein a sufficient space is left between the jaws 28 and 32 to allow a domestic animal to withdraw the foot from the trap without harm.

As already stated, when the animal stepping on contact plate 19 has a relatively thin leg, the spring in its sudden upward movement has time to pass the notch 30 and is already engaging against the upper section 41 of the inclined side of the jaw arm 27 and the side 42 of the upper short arm 35 of jaw 32 by the time that the spring comes to a stop and therefore will hold the jaws tightly upon the leg between them.

From the foregoing description and the accompanying drawing it is quite clear that the present trap is actually selective so that it will automatically operate when a domestic animal approaches and causes the spring to release and the jaws to operate, whereas when a wild animal steps on the contact plate the operation of the trap is conventional and the animal is held by the trap until the jaws are released by the hunter or farmer involved.

Manifestly variations may be resorted to in parts and features may be modified or used without others within the scope of the appended claims.

Having now fully described my invention, I claim:

1. In a pivoted jaw trap having a base plate with upwardly projecting end lugs, a cross plate secured to the intermediate portion of the base plate and projecting from one side thereof, a trip lever pivoted at one end to a portion upon the cross plate and having a detent at the pivoted end thereof and a contact plate upon another portion thereof, a pivoted jaw having a pair of opposite arms terminating in oppositely extending trunnions pivotally mounted in the end lugs, a latch member movably connected at one end to said cross plate in a position to engage the other end thereof with the detent and simultaneously hold the jaw down in open position on said cross plate, and a trap spring fixed at one end to said base plate within said one end lug thereon and having an eye within the other end through which one arm of the jaw extends in closed upright position of the latter, the features which include an inclined outer side upon one arm tapering toward the trunnion thereof and having a locking notch disposed a predetermined distance from said trunnion, a second jaw having one arm terminating in a trunnion pivotally mounted in said one end lug and an opposite short arm which terminates short of the other end lug, and a stub arm pivotally connected at one end to said short arm and having a trunnion on the other end pivotally mounted in said other end lug, the short arm and stub arm pivotally connected thereto being disposed at the end of said second jaw corresponding to that of the arm on the first-mentioned jaw having the tapered side with the locking notcth.

2. In a pivoted jaw trap having a base plate with upwardly projecting end lugs, a cross plate secured to the intermediate portion of the base plate and projecting from one side thereof, a trip lever pivoted at one end to a portion upon the cross plate and having a detent at the pivoted end thereof and a contact plate upon another portion thereof, a pivoted jaw having a pair of opposite arms terminating in oppositely extending trunnions pivotally mounted in the end lugs, a latch member movably connected at one end to said cross plate in a position to engage the other end thereof with the detent and simultaneously hold the jaw down in open position on said cross plate, and a trap spring fixed at one end to said base plate within said one end lug thereon and having an eye within the other end through which one arm of the jaw extends in closed upright position of the latter, the features which include an inclined outer side upon one arm tapering toward the trunnion thereof and having a locking notch disposed a predetermined distance from said trunnion, a second jaw having one arm terminating in a trunnion pivotally mounted in said one end lug and an opposite short arm which terminates short of the other end lug, a stub arm having a trunnion on one end pivotally mounted in said other end lug and a pivot member pivotally connecting the other end to the end of said short arm at a relatively shorter distance from the last-mentioned end lug than the distance from said locking notch upon the one arm of said first-mentioned jaw from the same end, the short arm and stub arm pivotally connected thereto being disposed at the end of said second jaw corresponding to that of the arm on the first-mentioned jaw having the tapered side with the locking notch.

3. In a pivoted jaw trap having a pair of cooperating pivoted jaws mounted to swing upwardly together from the base plate and a spring having an eye in one end thereof engaging with the arms of the jaws at one end of the base plate to close said jaws, the features which include a tapered outer working side upon one arm of one jaw having an intermediate notch therein adapted to be engaged by one side of the spring at the eye thereof, an inclined portion upon said side of the spring facilitating the engagement thereof with said notch, and a pivoted joint upon an intermediate portion of the corresponding arm at the same end of the trap upon the other jaw allowing said jaw at said end to pivot upon the pivot joint independently of the pivotal connection of the jaw at the same end to the base plate.

EDWARD J. SCHREIBER.

No references cited.